United States Patent [19]
Palumbo

[11] Patent Number: 5,533,188
[45] Date of Patent: Jul. 2, 1996

[54] FAULT-TOLERANT PROCESSING SYSTEM

[75] Inventor: Daniel L. Palumbo, Newport News, Va.

[73] Assignee: The United States of America as represented by the Administrator of the National Aeronautics and Space Administration, Washington, D.C.

[21] Appl. No.: 963,170

[22] Filed: Oct. 19, 1992

[51] Int. Cl.$^6$ .................................................. G06F 11/00
[52] U.S. Cl. ................................ 395/182.02; 395/182.08
[58] Field of Search .......................... 371/16.1, 68.1–.3, 371/8, 11.1–.3, 61, 1, 36, 30; 395/575, 275, 325, 182.02, 182.08; 370/4; 364/412, 419

[56] References Cited

U.S. PATENT DOCUMENTS

| | | | |
|---|---|---|---|
| H967 | 9/1991 | Mariotti | 370/112 |
| 4,497,059 | 1/1985 | Smith | 371/36 |
| 4,583,224 | 5/1986 | Ishii | 371/36 |
| 4,634,110 | 1/1987 | Julich et al. | 371/11 |
| 4,644,498 | 2/1987 | Bedard | 364/900 |
| 4,665,522 | 5/1987 | Lala et al. | 371/36 |
| 4,677,618 | 6/1987 | Haas | 371/1 |
| 4,774,709 | 9/1988 | Tulpule | 371/11 |
| 4,815,074 | 3/1989 | Jacobsen | 370/112 |
| 4,833,695 | 5/1989 | Greub | 375/118 |
| 4,870,637 | 9/1989 | Follett et al. | 370/4 |
| 4,907,232 | 3/1990 | Harper et al. | 371/36 |
| 4,965,879 | 10/1990 | Fischer, Jr. | 364/424.01 |
| 4,995,040 | 2/1991 | Best et al. | 371/36 |
| 5,020,023 | 5/1991 | Smith | 364/900 |
| 5,220,569 | 6/1993 | Hartness | 371/37.1 |
| 5,267,240 | 11/1993 | Bartow | 371/1 |
| 5,280,533 | 1/1994 | Blaum | 371/1 |

OTHER PUBLICATIONS

"Perfectly Secure Message Transmission", Author Dolev, Danny; Cynthia, Dwork, Journal Of The Assn. of CPU Machinery V40 N 1 Jan. 1993 pp. 17–47.

"Generating A fault Tolerant Global Clock In A High Speed Sys.," Author Ofek, Y. IEEE Comput. Soc. Press, 9th Annual Conference Proceedings Jun. 9, 1989 pp. 218–216.

Primary Examiner—Robert W. Beausoliel, Jr.
Assistant Examiner—Ly V. Hua
Attorney, Agent, or Firm—Robin W. Edwards; Kimberly A. Chasteen; George F. Helfrich

[57] ABSTRACT

A fault-tolerant, fiber optic interconnect, or backplane, which serves as a via for data transfer between modules. Fault tolerance algorithms are embedded in the backplane by dividing the backplane into a read bus and a write bus and placing a redundancy management unit (RMU) between the read bus and the write bus so that all data transmitted by the write bus is subjected to the fault tolerance algorithms before the data is passed for distribution to the read bus. The RMU provides both backplane control and fault tolerance.

15 Claims, 8 Drawing Sheets

FAULT-TOLERANT PROCESSING SYSTEM

ORIGIN OF THE INVENTION

The invention described herein was made by an employee of the U.S. Government and may be manufactured and used by or for the government for governmental purposes, without the payment of any royalties thereon or therefor.

BACKGROUND OF THE INVENTION

1. Field of the Invention

The present invention relates generally to a fault-tolerant fiber optic backplane and, more particularly, to a fault-tolerant fiber optic backplane having a redundancy management unit for interconnecting local modules to external backplanes and their redundant modules.

2. Description of the Related Art

Fiber optic cable provides high speed data transfer, electrical isolation and immunity from electromagnetic interference. An application that would benefit from the use of fiber optic cable is the module interconnect (or "backplane" as it has been classically termed). A drawback of using fiber optic cable is that, to achieve high transmission speeds, it is necessary to synchronize the fiber optic transmitter and receiver. This requirement leads to point-to-point topologies, which are common in fiber optic networks. A backplane typically has a multi-drop connectivity, which allows each module on the backplane to directly access any other module on the backplane. Such connectivity is only achieved in point-to-point networks through fully connected topology, i.e., every module is connected to every other module. This type of connectivity is costly in terms of fiber optic transmitters and receivers.

In U.S. Pat. No. 4,870,637 issued to Follett et al. on Sep. 26, 1989, an optical backplane is described which uses a centralized switch that includes a switch block and a timing generation block. The centralized switch optically interconnects modules having fiber optic transmitters and receivers. To support high speed transmission, the fiber optic transmitters and receivers must be synchronized. For this purpose, a separate timing signal is provided to each module by the timing generation block. The addition of a separate timing signal, however, doubles the cost of a serial backplane, i.e., a backplane that transfers one bit at a time. Consequently, it is desirable to eliminate the requirement for a separate timing signal.

Many architectures have used time division multiplexing on internal electronic buses to interconnect modules and on external electronic buses to interconnect computers. Optical interconnects are usually designed with optical receiver clocks derived from a circuit which is phase locked with the transmitted optical signal. To maintain lock, the optical transmitter sends empty messages when real data is not available. Designers have not used time division multiplexing with optical buses due to the time penalty associated with reestablishing phase lock between the receiver/transmitter pairs when different transmitters begin to use the bus. Rather, token passing protocols, which carry less of a timing penalty, are used to provide optical interconnects. Token passing protocols, however, require more hardware and software to implement.

Conventional optical interconnects, such as the optical backplane disclosed in the Follett et al. patent, are not fault-tolerant. Conventionally, in electronic systems, fault tolerance is achieved by producing and maintaining redundant information that can be later analyzed to yield, even in the presence of errors in the redundant information, the correct original information. The degree of fault tolerance and, therefore, the reliability of the resulting system, depends on the amount of redundant information used. However, increasing redundancy adds cost both in material and performance.

One parameter of fault tolerance is the redundancy depth, e.g., dual, triplex and quad. U.S. Pat. No. 4,634,110 issued to Julich et al. on Jan. 6, 1987 describes a dual redundant fault detection and redundancy management system. Dual redundancy has the disadvantage of being unable to provide error masking, as may be provided with greater redundancy depth by incorporating voting circuitry. Instead, dual redundancy relies upon the passive failure of a faulty master unit.

Another parameter of fault tolerance is the level at which the redundant information is provided, e.g., gate, chip, module or subsystem. In the system disclosed in the Julich et al. patent, the redundant information is produced at the subsystem level, i.e., master unit. Thus, when a single component, e.g., a processor, of the subsystem fails the entire subsystem is disabled. This greatly increases the cost of failure and reduces system availability.

A third parameter of fault tolerance is synchronization. U.S. Pat. No. 4,497,059 issued to Smith on Jan. 29, 1985 and U.S. Pat. No. 4,665,522 issued to Lala et al. on May 12, 1987 disclose multi-channel redundant processing systems that are tightly synchronized, i.e., each channel is forced to execute identical instructions at exactly the same time. However, tightly synchronized systems are disadvantageous because they do not have the ability to simultaneously execute different instruction streams to increase reliability and performance.

U.S. Pat. No. 4,995,040 issued to Best et al. on Feb. 19, 1991 discloses an apparatus for management, comparison and correction of redundant digital data. This system uses a redundancy management unit that contains logic and control circuitry to implement fault tolerance algorithms. Similarly, U.S. Pat. No. 4,907,232 issued to Harper et al. on Mar. 6, 1990 discloses a fault-tolerant parallel processing system that includes network elements having logic and control circuitry to implement fault tolerance algorithms. Neither the Best et al. patent nor the Harper et al. patent address the requirements of connecting their respective redundancy management unit and network elements to fiber optic medium. Moreover, neither the Best et al. patent nor the Harper et al. patent address the vulnerability of the system to failure of their respective redundancy management unit and network elements. Making several replicated devices dependent on the correct operation of a single redundancy management unit as disclosed in the Best et al. patent, or on a single network element as disclosed in the Harper et al. patent, reduces the reliability and availability of the system.

Therefore, fiber optic backplanes have been proposed that are not fault-tolerant, and electronic fault-tolerant systems have been designed which do not address the needs of fiber optic interconnects. Further, the electronic fault-tolerant systems that have been proposed have limitations in system reliability and availability due to failure of a redundancy management unit or network element.

SUMMARY OF THE INVENTION

It is an object of the present invention to provide a fault-tolerant processing system for fiber optic networks in which control of the backplane is decentralized.

It is another object of the present invention to provide a fault-tolerant processing system in which a multiplexor is controlled to isolate the modules from one another.

It is another object of the present invention to provide a fault-tolerant processing system in which a redundancy management unit is embedded in and controlled by the backplane so the redundancy management unit can service modules connected to the backplane while remaining independent of host processors or controller modules connected to the backplane.

It is another object of the present invention to provide a fault-tolerant fiber optic backplane that synchronizes fiber optic transmitters and receivers without providing a separate timing signal.

It is another object of the present invention to provide a fault-tolerant fiber optic backplane having at least a triplex redundancy depth to provide error masking.

It is another object of the present invention to provide a fault-tolerant fiber optic backplane having module level redundancy.

It is another object of the present invention to provide a fault-tolerant fiber optic backplane that need not be tightly synchronized.

It is a further object of the present invention to provide a fault-tolerant fiber optic backplane that addresses the vulnerability of redundancy management unit failure.

It is a further object of the present invention to provide a fault-tolerant fiber optic backplane suited for use in flight control systems and which decreases the system's susceptibility to upset caused by high intensity radiated fields and lightning strikes.

It is a further object of the present invention to provide a fault-tolerant fiber optic backplane having low maintenance requirements and high reliability.

In order to achieve the foregoing and other objects, in accordance with the purposes of the present invention as described herein, the present invention uses a fiber optic interconnect, or backplane, which serves as a via for data transfer between modules. Fault tolerance algorithms are embedded in the backplane by dividing the backplane into a read bus and a write bus and placing a redundancy management unit (RMU) between the read bus and the write bus so that all data transmitted by the write bus is subjected to the fault tolerance algorithms before the data is passed for distribution to the read bus. The RMU provides both backplane control and fault tolerance.

Access to the backplane is controlled by a global time that is established in the RMU and distributed to the local modules attached to the backplane. Data is identified by the global time at which the data is received, as opposed to using identification information added to the data. This results in a reduction in data overhead. The fiber optic receivers/transmitters must be synchronized to support high speed transmissions. The RMU has the only transmitter inputting data onto the read bus. Consequently, the local modules can synchronize to the data stream transmitted over the read bus. The write bus, however, is multiplexed, i.e., each of the local modules has a transmitter that inputs data onto the write bus. Accordingly, the optical transmitters of the local modules must be synchronized. This is accomplished by deriving the timing of the transmitters in the local modules from the timing of the receivers in the local modules, which is derived from the global time base in the RMU. All module transmitters will thus be synchronized to the same time base.

Fault tolerance is achieved by using additional fiber optic cables to interconnect the RMU with redundant RMUs in external backplanes, forming a redundant RMU set. Redundant information produced by redundant modules attached to the external backplanes and interconnected with the redundant RMUs is channeled through the additional fiber optic cables and then through masking, deskewing and voting algorithms in the RMU. In each of the external backplanes, a fiber optic write bus and a fiber optic read bus interconnect the redundant modules to the redundant RMU. Production and transmission of the redundant information onto the fiber optic write buses of the external backplanes is controlled by the time base which is established across the RMU redundant set through the additional fiber optic cables.

Additional fault tolerance is provided by protecting the backplane itself from failure. The write bus is protected by dissimilar duality, i.e., both a local module and the RMU must agree that the local module's data should be gated onto the write bus. The read bus is protected by transmitting data through replicated transmitters and optical fiber cables. The resulting data streams are combined at the module receiver so that no single failure of an RMU transmitter will corrupt the message. Preferably, the entire RMU is replicated to form an RMU complex, thus providing protection against any single RMU failure in the RMU complex. The RMU complex thus becomes a fault-tolerant time base which can keep the replicated RMUs in exact lock step at high speed through the additional fiber optic cables.

These and other features and advantages of the present invention will become more apparent with reference to the following detailed description and drawings. However, the drawings and description are merely illustrative in nature, and not restrictive.

BRIEF DESCRIPTION OF THE DRAWINGS

The accompanying drawings illustrate several aspects of the present invention and, together with a description, serve to explain the principles of the present invention. Like numerals denote like elements.

In the drawings.

DETAILED DESCRIPTION OF THE PREFERRED EMBODIMENTS

Figure 1:
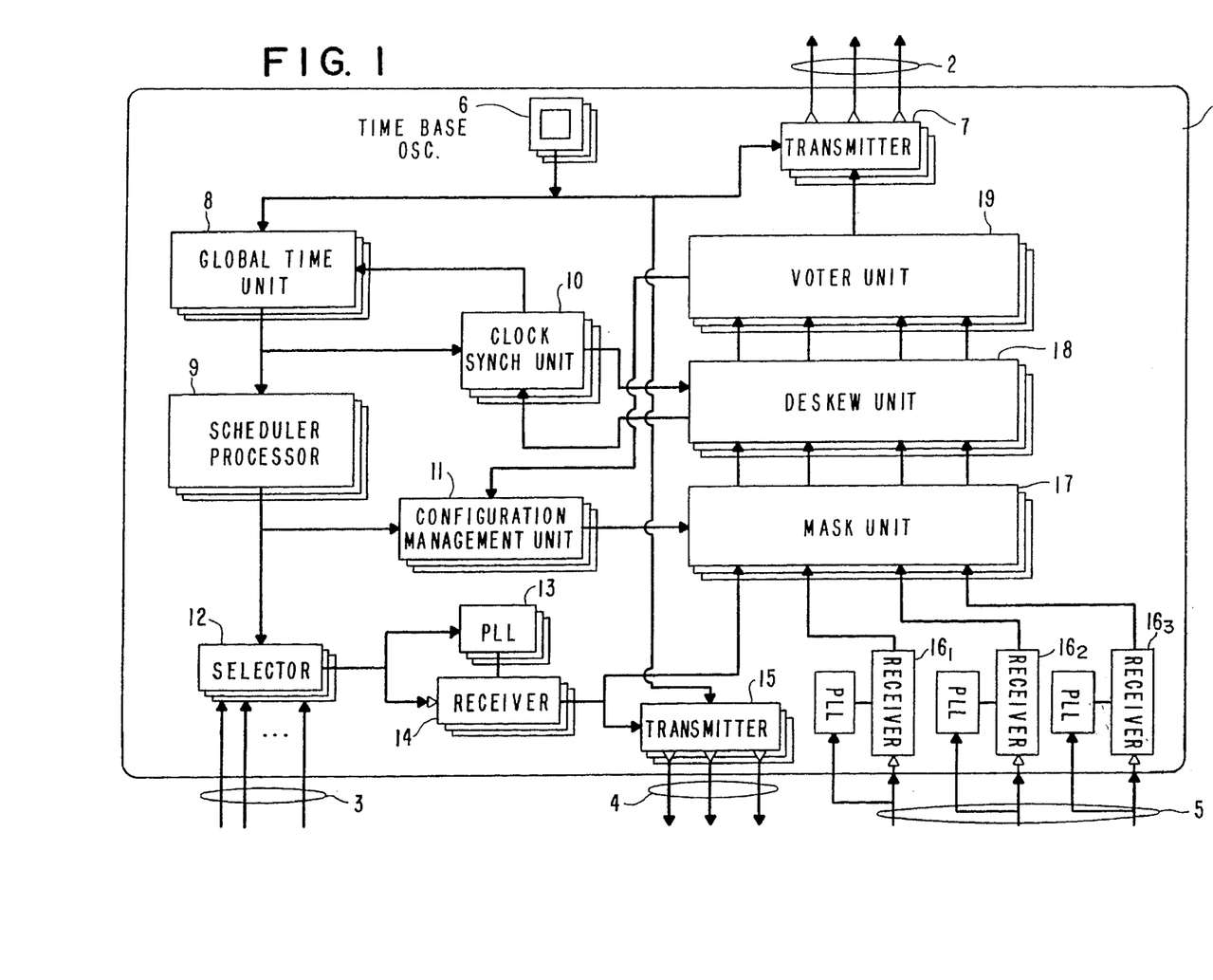
FIG. 1 is a block diagram of a redundancy management unit of a fault-tolerant fiber optic backplane according to the present invention.

FIG. 1 is a block diagram of an redundancy management unit (RMU) 1 of a first embodiment of a fault-tolerant fiber optic backplane according to the present invention. RMU 1 is placed between a read bus 2, having one or more fiber optic cables and write bus 3, having a plurality of fiber optic cables. Although FIG. 1 shows three fiber optic cables in read bus 2, the number of fiber optic cables in read bus 2 is determined by the reliability and maintainability goals of the particular application. The fiber optic cables of read bus 2 are connected to one or more fiber optic transmitters 7. Although three fiber optic transmitters 7 are shown in FIG. 1 (i.e., indicated by the triplicated replication depth), the number of fiber optic transmitters 7 used is determined by the reliability and maintainability goals of a particular application.

As discussed below, each fiber optic cable of write bus 3 connects RMU 1 to a fiber optic transmitter of a local processing module (shown in FIG. 3). Throughout the application, the term "local" refers to elements attached to the backplane, while the terminology "external backplanes" refers to additional backplanes.

As with transmitter 7, all components of RMU 1 may be replicated as necessary to provide the reliability and maintainability necessary for a particular application. In FIG. 1, for example, replication of various elements is indicated by triplicated replication depth. Preferably, the entirety of RMU 1 is replicated so that data resulting from each of the replicated RMUs is transmitted over a corresponding fiber optic cable of read bus 2. As discussed below, the data from the replicated RMUs is combined at each of the local processing modules. This replication of RMU 1 is made possible by the use of a time base oscillator 6, which may be a crystal oscillator, for example. Time base oscillator 6 provides an identical time base throughout the replicated RMUs. Time base oscillator 6 is connected to global time unit 8, which may be a counter register, for example. Global time is accumulated in global time unit 8. The global time from global time unit 8 is provided to scheduler processor 9 and clock synchronization unit 10. The clock synchronization unit 10 is connected to a deskew unit 18 to monitor the data streams from the redundant RMU set (which is discussed below with respect to FIG. 2 and which is not to be confused with the replicated RMUs) in order to maintain a consistent global time across the redundant RMU set. Clock synchronization unit 10 uses a suitable clock synchronization algorithm. Such clock synchronization algorithms are conventional and well-known to those in the art. For example, F. B. Schneider, "Understanding Protocols for Byzantine Clock Synchronization", Cornell University Technical Report 87-859, August 1987 and R. W. Butler, "A Survey of Provably Correct Fault-Tolerant Clock Synchronization Techniques", NASA Technical Memorandum 100553, February 1988, which are incorporated herein by reference, disclose such suitable Clock synchronization algorithms.

In a real time system, such as the present invention, most data is repeated during specific intervals of time. Scheduler processor 9 contains a table of message information versus global time. This message information identifies the data and the local processing module which produced the data. The scheduler processor 9 passes this message information to a configuration management unit 11 and a selector 12. The scheduler processor 9 may be a conventional data processor (computer).

The configuration management unit 11 is connected to a voter unit 19 to monitor the health of the local processing modules and the redundant processing modules (discussed below with respect to FIG. 5). Consequently, configuration management unit 11 contains information related to the health of the local processing modules and the redundant processing modules in order to disable the data streams of known failed local processing modules and redundant processing modules when data supplied by those modules are being processed by RMU 1. Data streams from failed local processing modules and failed redundant processing modules are disabled by a mask unit 17 based upon the information supplied by configuration management unit 11. The configuration management unit 11 may be a conventional data processor (computer), for example.

Selector 12 uses the message information provided by scheduler processor 9 to enable a fiber optic line associated with the local processing module producing data at the global time, i.e., data from one of the fiber optic cables in write bus 3 is output from selector 12 and input to a phased locked loop (PLL) 13 and an optical receiver 14. Preferably, selector 12 is an optical switch. Because scheduler processor 9 has control of which one of the fiber optic cables of write bus 3 has access to receiver 14, faulty local processing modules are prohibited from over-utilizing RMU 1. Global time unit 8, scheduler processor 9 and selector 12 make up one portion of a dissimilar dual which controls access to RMU 1. The second part of the dissimilar dual will be discussed below relative to the local processing modules.

To support high speed data transmission, optical receiver 14 is clocked by PLL 13, which locks its internal clock to the incoming data stream from optical switch 12. Alternatively, to increase the stability of PLL 13, PLL 13 may be clocked directly by time base oscillator 6. Normally, switching between multiple data streams would represent a problem, as this would require the PLL to relock. In the present invention, as discussed below, the multiple transmitters in the local processing modules are themselves clocked by PLLs, which are in turn locked to the data stream produced by transmitter 7 of RMU 1. The multiple transmitters in the local processing modules thus have the same clock source, i.e., time base oscillator 6, thereby reducing skew and drift and minimizing lock time for PLL 13 of RMU 1. The data stream is converted from optic to electronic by receiver 14. Receiver 14 feeds the data stream to an optical transmitter 15 and mask unit 17. Optical transmitter 15 feeds a bus 4, which includes a plurality of fiber optic cables. Each of the fiber optic cables of bus 4 feeds a corresponding one of the redundant RMUs. Transmitter 15 converts the data stream from electronic to optic and transmits the data stream from receiver 14 in accordance with the time base from time base oscillator 6.

Figure 2:
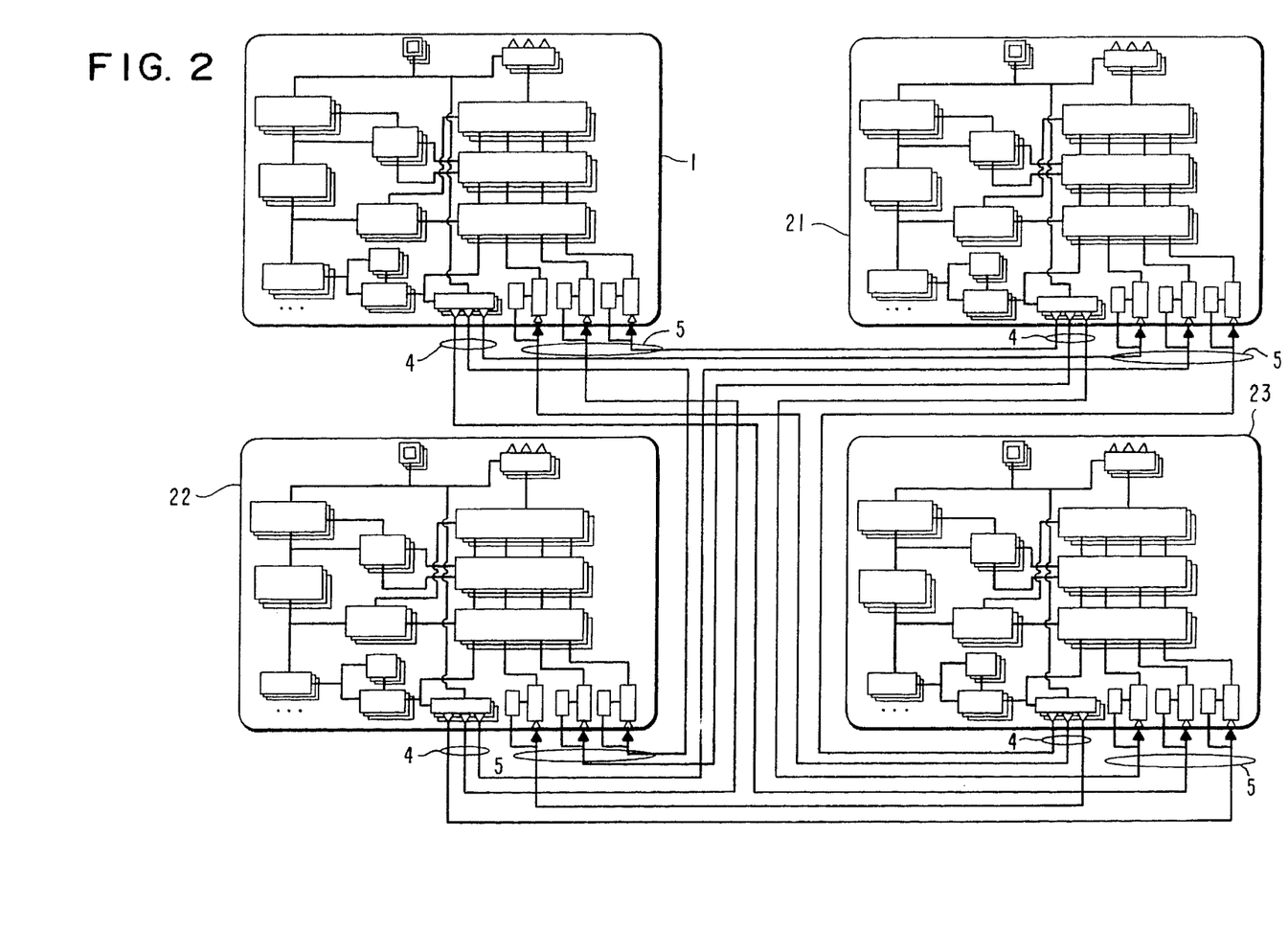
FIG. 2 shows the fiber optic interconnection among four redundancy management units, each identical to that shown in FIG. 1, in a quad-redundant set.

FIG. 2 shows the fiber optic interconnection among four RMUs 1, 21, 22 and 23 in a quad-redundant set. Each of redundant RMUs 21, 22 and 23 is identical to RMU 1. The data stream through the fiber optic cables of bus 4 in each of RMUs 1, 21, 22 and 23 is routed to fiber optic cables of a bus 5 in each of the other three redundant RMUs. Each of RMUs 1, 21, 22 and 23 are provided on separate backplanes. Although a quad-redundant RMU set is shown, the redundancy depth may be adjusted to provide the reliability and availability necessary for a particular application.

Because RMU 1 and the redundant RMUs 21,22 and 23 are performing the identical operation at about the same time, data streams from redundant RMUs 21,22 and 23 begin to be received through bus 5 and receivers $16_1$, $16_2$ and $16_3$ (shown in FIG. 1). These data streams are fed, along with a local data stream from receiver 14, to mask unit 17. According to configuration commands from configuration management unit 11, mask unit 17 disables none, one or more of the data streams. Receivers $16_1$, $16_2$ and $16_3$ convert the data streams from redundant RMUs 21, 22 and 23 from optic to electronic. Further, each of receivers $16_1$, $16_2$ and $16_3$ is clocked by a PLL which has locked its internal clock to the incoming data stream.

The data streams are then fed to deskew unit 18. Any expected timing skew is removed from the data streams in accordance with the clock synchronization algorithm of clock synchronization unit 10. Clock synchronization unit 10 monitors, through connection with deskew unit 18, the data stream skew and collects skew data as input to the clock synchronization algorithm. The clock synchronization algorithm computes a correction which is applied to global time unit 8. This correction will keep this skew between the data streams less than a maximum amount in accordance with the clock synchronization algorithm. In support of clock synchronization among local processing modules connected to RMU 1, scheduler processor 9 generates a synchronization command, and inserts the synchronization command into the data stream and onto read bus 2 through clock synchronization unit 10 and deskew unit 18. This synchronization command causes the local processing modules to synchronize their global time register to the global time of RMU 1, i.e., through the synchronization command.

From deskew unit 18, the data streams pass to a voter unit 19, where the data are compared and corrected data produced. Voter unit 19 may use one of many conventional and well-known voting algorithms, including majority vote, plurality vote and mid-value select. The corrected data stream is then fed to optical transmitter 7, where the corrected data are converted from electronic to optic and sent along read bus 2 in accordance with the time base from time base oscillator 6.

Figure 3:
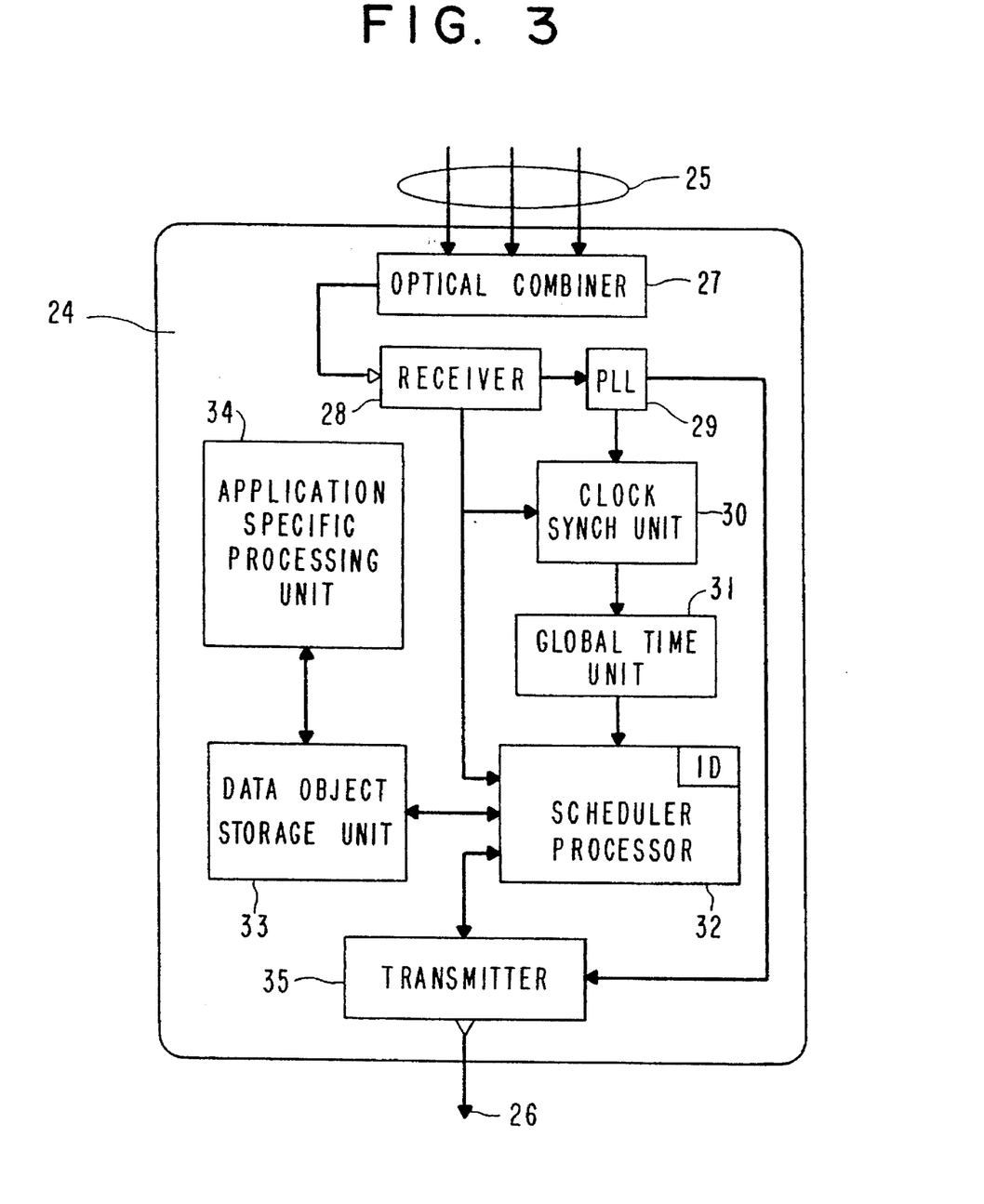
FIG. 3 is a block diagram of a processing module of a fault-tolerant fiber optic backplane according to the present invention.

FIG. 3 is a block diagram of a processing module 24, which is connected to RMU 1 through a read bus 25 and a write bus 26. The fiber optic cables of read bus 25 in processing module 24 correspond with the fiber optic cables of read bus 2 of RMU 1. The fiber optic cable of write bus 26 corresponds with one of the fiber optic cables of write bus 3 of RMU 1. As discussed above, the read bus 25 may be replicated to increase reliability. If it is, the replicated optical signals are passed through an optical combiner 27 and then a threshold enforcing receiver 28. Receiver 28 converts the optical signals to electronic signals. In addition, receiver 28 is threshold enforcing and thus allows a majority of good optical signals to overwhelm a minority of erroneous optical signals. This is only possible if the optical signals are tightly synchronized, which they are because they are produced using a single time base in RMU 1. The data stream from receiver 28 is fed to a PLL 29, a clock synchronization unit 30 and a scheduler processor 32. PLL 29 locks its clock with the data stream, thus regenerating the time base of RMU 1. The regenerated time base is fed to an optical transmitter 35 and the clock synchronization unit 30. Because the transmitter 35 of each local processing module 24 is driven by the clock derived by PLL 29, the transmitter 35 of each local processing module 24 is synchronized. Thus, data from each local processing module 24 is able to be multiplexed into write bus 3 of RMU 1.

Clock synchronization unit 30 monitors the data stream from receiver 28 for the synchronization command issued by scheduler processor 9 of RMU 1. Clock synchronization unit 30 also inputs the clock derived by PLL 29 to a global time unit 31. On receipt of the synchronization command, clock synchronization unit 30 causes global time unit 31 to be set to the global time of RMU 1. Global time unit 31 may be a counter register, for example. Global time unit 31 sends the global time to scheduler processor 32.

The scheduler processor 32 of processing module 24, like scheduler processor 9 in RMU 1, contains a table of message information versus global time. Also, like scheduler process 9 in RMU 1, scheduler processor 32 may be a conventional data processor (computer). In addition, scheduler processor 32 contains a unique ID which identifies in the table the data requirements of processing module 24. Scheduler processor 32 is also connected to receive the data stream from receiver 28. Moreover, scheduler processor 32 is connected to transfer data to optical transmitter 35, and to transfer data to and from data object storage unit 33. The scheduler processor 32, as determined by the global time from global time unit 31 and the ID, either assembles the incoming data stream from receiver 28 and stores it in appropriate locations in data object storage unit 33, retrieves data from data object storage unit 33 and sends the data to optical transmitter 35, or does nothing. Optical transmitter 35 converts the data from electronic to optic and inputs the data to write bus 26.

As discussed above, the dissimilar dual controls access to RMU 1. The first part of the dissimilar dual is global time unit 8, scheduler processor 9 and selector 12 of RMU 1. The second part of the dissimilar dual is global time unit 31, scheduler processor 32 and transmitter 35 of processing module 24.

Data in data object storage unit 33 may be read and written by an application specific processing unit 34, which may be a conventional data processor (computer), and which is specific to processing module 24. Application specific processing unit 34 requires access to the global time, e.g., through scheduler processor 32 and data object storage unit 33, to coordinate its actions with data reception and transmission.

Figure 4:
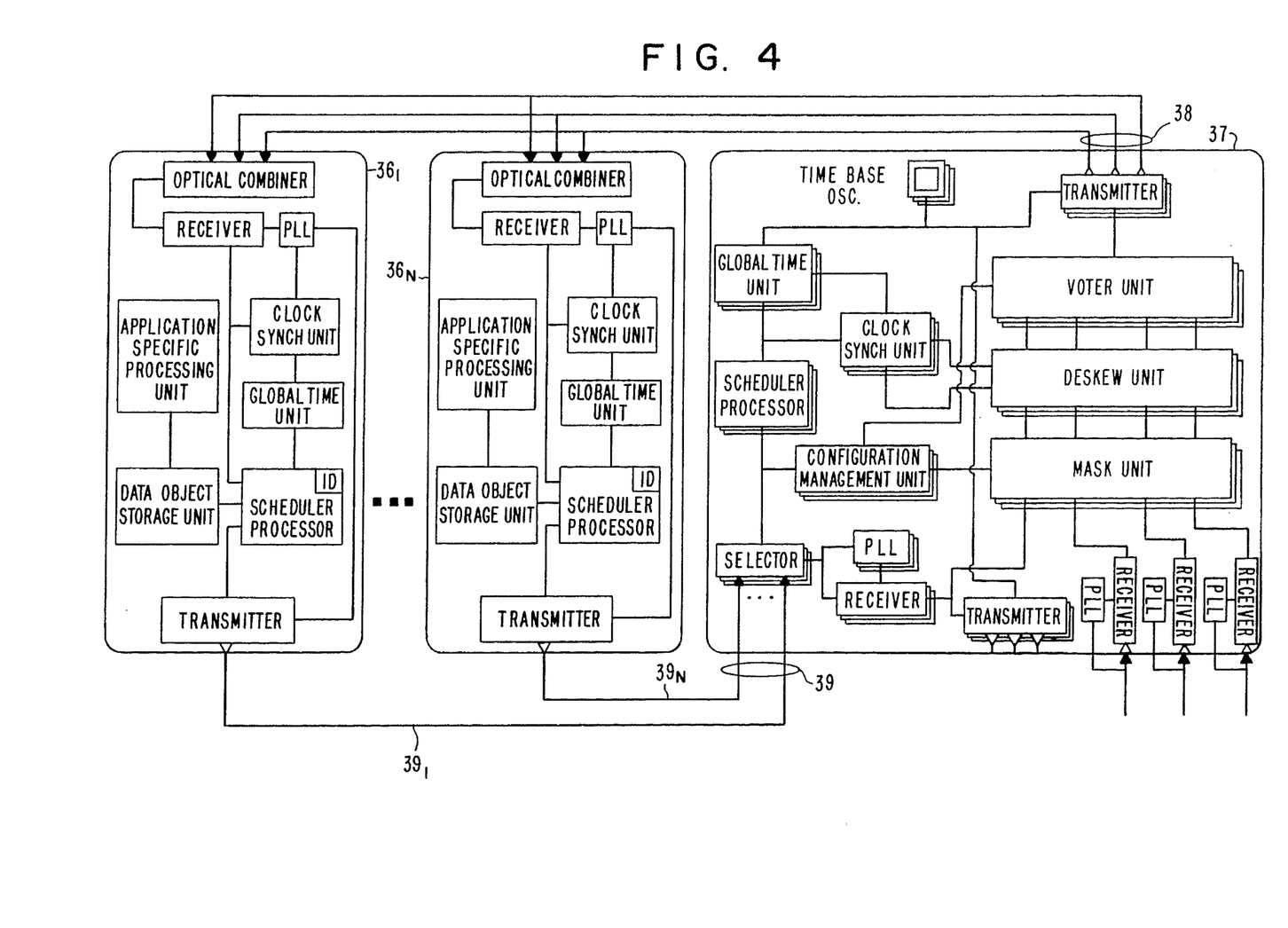
FIG. 4 shows a local fiber optic write bus and a local fiber optic read bus interconnecting a plurality of processing modules identical to that shown in FIG. 3 and a redundancy management unit identical to that shown in FIG. 1.

FIG. 4 shows a local fiber optic read bus 38 and a local fiber optic write bus 39 interconnecting a plurality of processing modules $36_1 \ldots 36_N$ and an RMU 37. Processing modules $36_1 \ldots 36_N$ each correspond to processing module 24 shown in FIG. 3. Processing modules $36_1 \ldots 36_N$ are identical to each other, except that the application specific processing unit and the ID of the scheduler processor are specific to each processing module. RMU 37 corresponds to RMU 1 of FIG. 1. Thus, read bus 38 of RMU 37 corresponds to read bus 2 of RMU 1, while write bus 39 of RMU 37 corresponds to write bus 3 of RMU 1. FIG. 4 shows only one channel.

Figure 5:
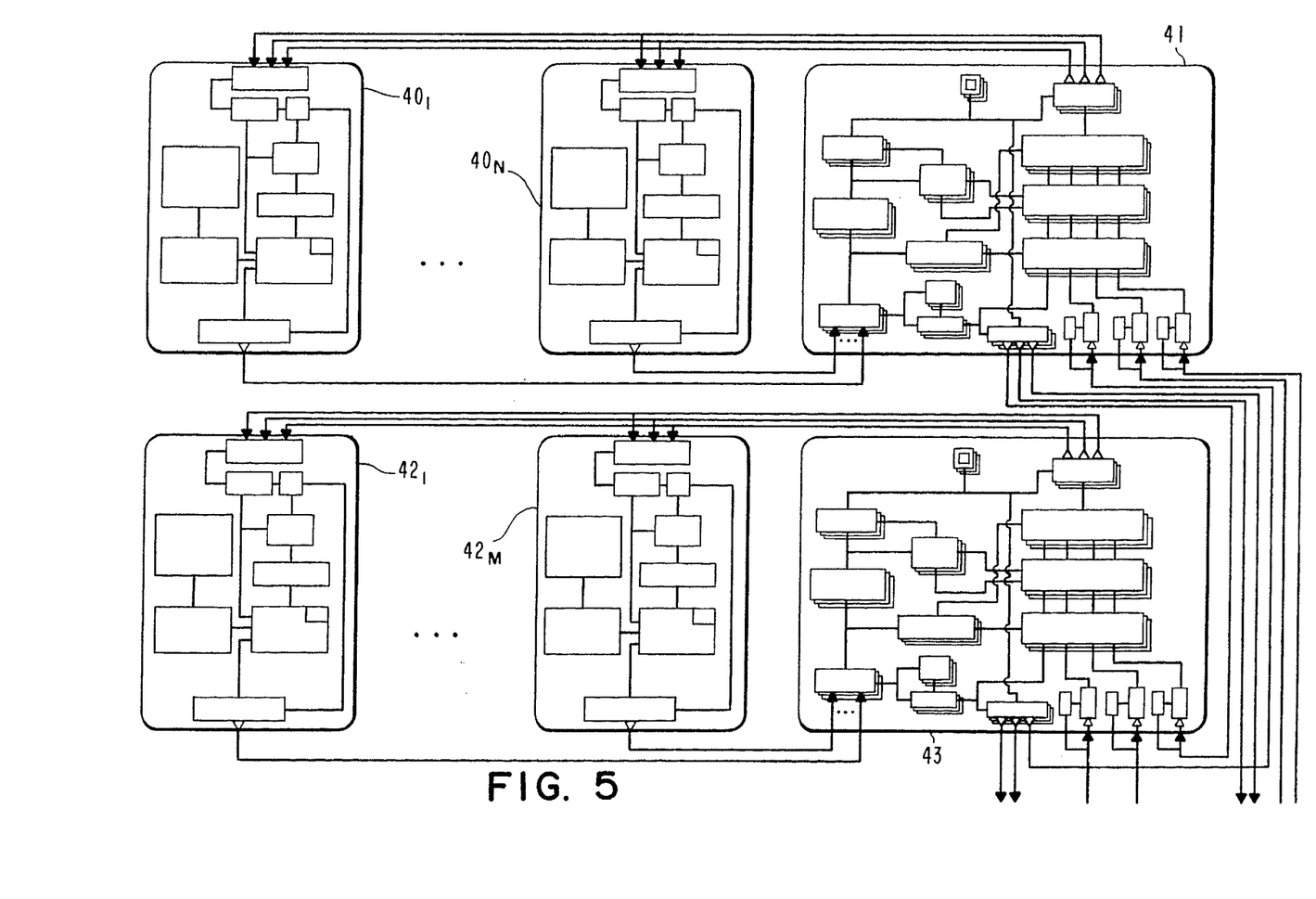
FIG. 5 shows two channels of a quad-redundant redundancy management unit set identical to that shown in FIG. 2, each channel of which includes a local fiber optic write bus and a local fiber optic read bus for connecting a plurality of processing modules identical to that shown in FIG. 3.

FIG. 5 shows two channels of the quad-redundant RMU set shown in FIG. 2. Each channel includes a local fiber optic write bus and a local fiber optic read bus that connect an RMU to a plurality of processing modules. RMUs 41 and 43 correspond to RMU 1 shown in FIG. 1, and are identical to each other and the other two redundant RMUs (not shown) of the quad-redundant RMU set. At least one of processing modules $40_1 \ldots 40_N$ and at least one of processing modules $42_1 \ldots 42_M$ correspond to processing module 24 of FIG. 3. Processing modules $40_1$ and $42_1$ may be, for example, identical. Two identical processing modules that are identical to processing modules $40_1$ and $42_1$ are respectively included in the third and fourth channels that are not shown in FIG. 5. Other processing modules $40_2$ and $42_2$ (not shown) may be identical to processing modules $40_1$ and $42_1$, except that the application specific processing unit and the ID of the scheduler processor of each are specific to the processing module. Two additional processing modules identical to processing modules $40_2$ and $42_2$ (not shown) are respectively included in the third and fourth channels that are not shown in FIG. 5. At least one of processing modules $40_1 \ldots 40_N$ and $42_1 \ldots 42_M$ may have a lower redundancy depth (i.e., less than quad) so that M does not necessarily equal N. Alternatively, at least one of processing modules $40_1 \ldots 40_N$ and $42_1 \ldots 42_M$ may instead be an I/O module or simplex processor, as discussed below.

Increased fault isolation on the write bus can be achieved by using a different wavelength transmitter for each of the processing modules and a broadband receiver in the RMU. The RMU and the read and write buses must have the bandwidth to pass all local and global traffic.

Figure 5A:
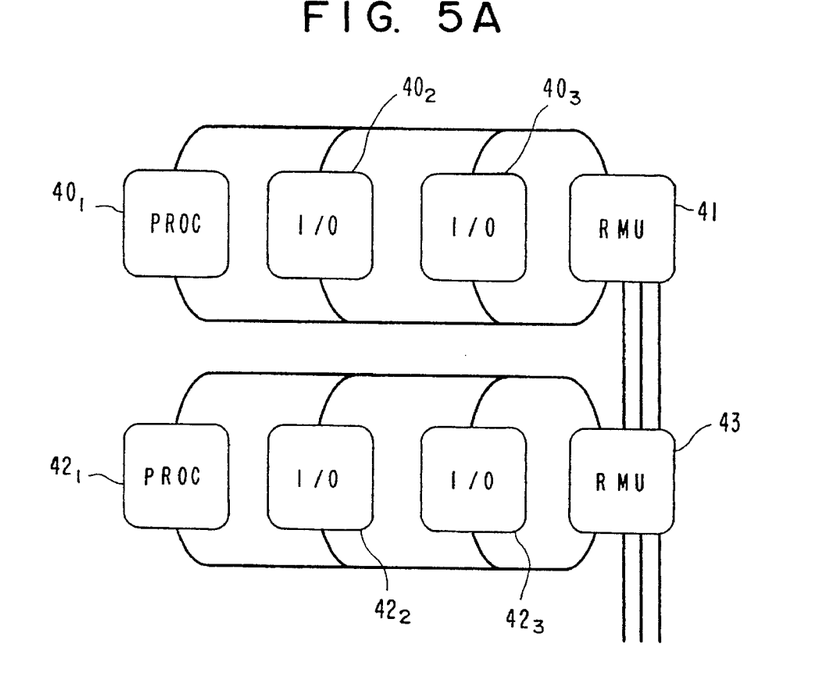
FIG. 5A corresponds with FIG. 5 but shows I/O modules connected within the channels of the quad-redundant redundancy management unit set, in addition to processing modules.

The present invention provides a processing and communications platform which will meet the requirements of flight critical tasks. Surplus throughput and bandwidth can be utilized by non-critical tasks. For example, some of the processing modules may correspond to flight critical tasks, while other processing modules correspond to non-critical tasks. Non-critical hardware (e.g., I/O modules) can also be integrated into the present invention, as shown in FIG. 5A. FIG. 5A corresponds to FIG. 5, except that I/O modules $40_2$, $40_3$, $42_2$ and $42_3$ are connected to read and write buses. I/O modules $40_2$, $40_3$, $42_2$ and $42_3$ correspond to processing module 24 of FIG. 3, but may include a sensor or actuator, as application specific processing unit 34. Accordingly, working processing modules may be given access to I/O modules on channels with failed processing modules. For example, in FIG. 5A, if processing module $40_1$ failed, then its I/O modules $40_2$ and $40_3$ would still be accessible by working processing unit $42_1$.

I/O modules or simplex processes on a channel will be required to pass their output through the mask, deskew and voter circuits of the RMU. For example, if single source data is generated by I/O module $40_2$, when the single source data is to be passed through RMU 41, all four channels must command RMU 41 to open its channel for a finite time for the single source distribution. At the end of this time, RMU 41 will return to quad-channel operation as discussed above. Data consistency of single source data can be guaranteed by performing a write/read operation of the new replicated data to the backplane. This procedure satisfies the requirements of the Interactive Consistency Algorithm as described by L. Lamport in "The Byzantine Generals Problem", ACM Transactions on Programming Languages and Systems", Volume 4, No. 3, pp. 382–401, July 1982, which is incorporated herein by reference, and which is designed to protect against Byzantine failures, i.e., a single failure which could cause different non-failed modules to interpret the same transmission differently.

Figure 6:
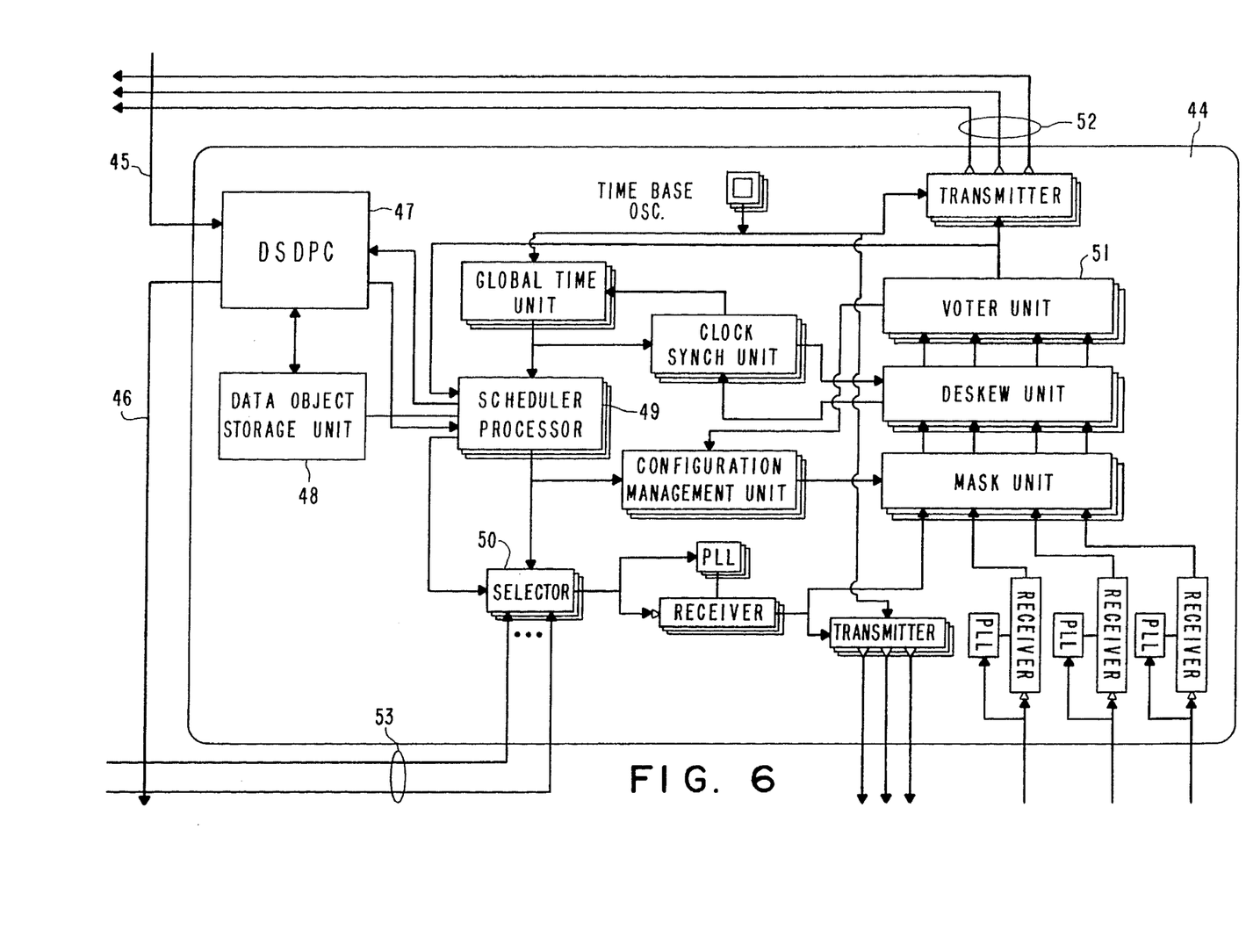
FIG. 6 is a block diagram of a second embodiment of the present invention wherein the redundancy management unit is integrated with a distributed system data path controller to form a distributed system data path module.

FIG. 6 is a block diagram of a second embodiment of the present invention wherein the RMU is integrated with a distributed system data path controller (DSDPC) 47 to form a distributed system data path (DSDP) module 44. The RMU of DSDP module 44 corresponds with RMU 1 shown in FIG. 1. The DSDP module 44 is especially desirable if the RMU is not replicated and thus requires few resources. Integration is optimized if the RMU is integrated with a networking application. This arrangement brings a fault-tolerant connection to the network relative to processing modules connected to DSDP module 44 via a read bus 52 and a write bus 53. Read bus 52 of DSDP module 44 corresponds to read bus 2 of RMU 1 shown in FIG. 1. Similarly, write bus 53 of DSDP module 44 corresponds to write bus 3 of RMU 1 shown in FIG. 1. Accordingly, local processing modules (shown in FIG. 7A) are connected to DSDP module 44 through read bus 52 and write bus 53. In FIG. 6, the network is shown as an input network line 45 and an output network line 46. Network lines 45 and 46 are controlled by DSDPC 47, which behaves as an application, retrieving and writing data into data object storage unit 48. The DSDPC 47 can also retrieve data from a voter unit 51 under control of a scheduler processor 49. Voter unit 51 of DSDP module 44 corresponds with voter unit 19 of RMU 1 shown in FIG. 1. The DSDPC 47 can also write data to a selector 50 under control of scheduler processor 49. DSDPC 47 may be a conventional data processor (computer).

The scheduler processor 49 of DSDP module 44 corresponds to scheduler processor 9 of RMU 1 shown in FIG. 1, except that scheduler processor 49 can retrieve data directly from voter unit 51, i.e., before transmission onto read bus 52, and write data directly to selector 50 without going over write bus 53. Scheduler processor 49 can, thus, route the data stream from DSDPC 47 through the RMU masking, deskewing and voter circuits. In other respects, DSDP module 44 is identical to RMU 1 shown in FIG. 1.

Figure 7:
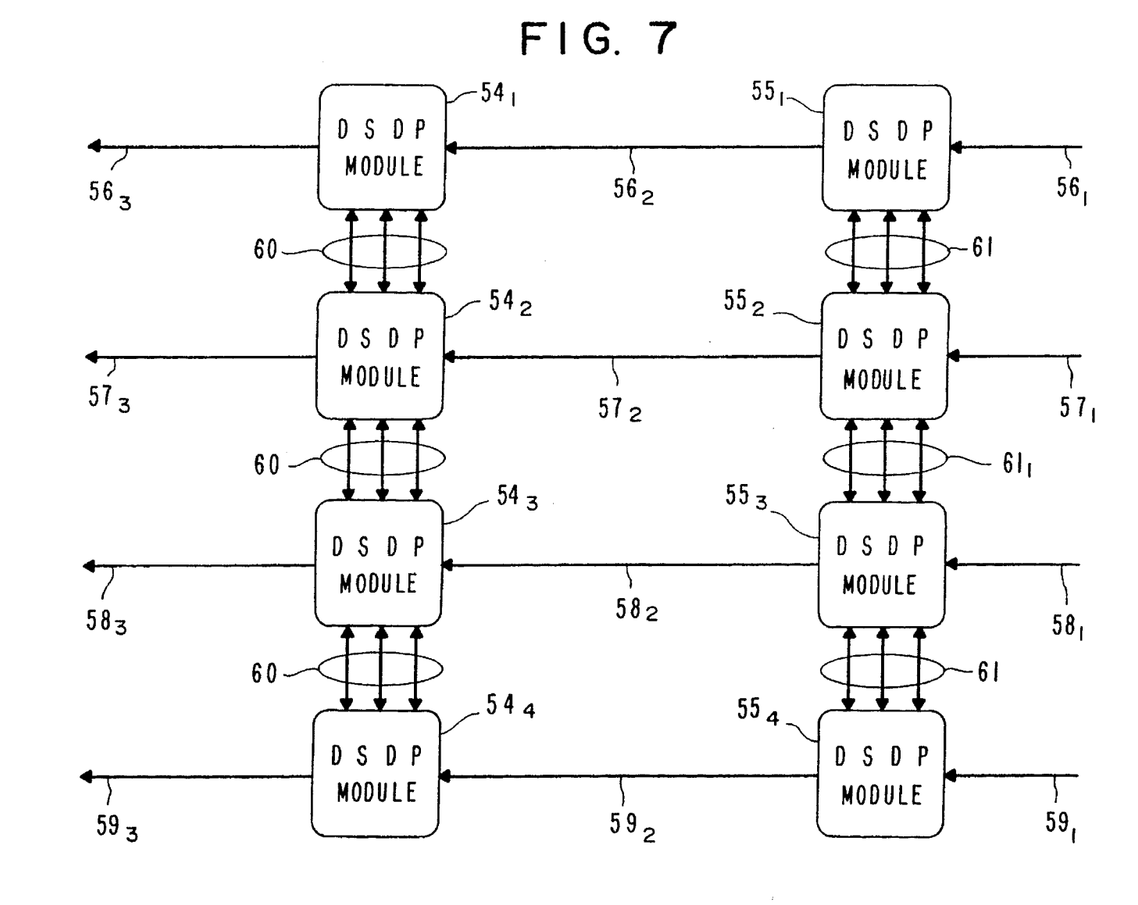
FIG. 7 is a block diagram of a four channel distributed system data path including two fault-tolerant sites, each of which includes a quad-redundant distributed system data path module set.

FIG. 7 is a block diagram of a four channel distributed system data path (DSDP) including two fault-tolerant sites. Each fault-tolerant site includes a quad-redundant DSDP module set. For example, DSDP modules $54_1$, $54_2$, $54_3$ and $54_4$ form a first fault-tolerant site, while DSDP modules $55_1$, $55_2$, $55_3$ and $55_4$ form a second fault-tolerant site. Each of DSDP modules $54_1$, $54_2$, $54_3$, $54_4$, $55_1$, $55_2$, $55_3$ and $55_4$ correspond to DSDP module 44 shown in FIG. 6. The DSDP modules at each fault-tolerant Site are interconnected within the site. In FIG. 7, each of these interconnects are schematically represented for simplicity by interconnects 60 and 61, each of which in reality corresponds to both read and write buses 4 and 5 shown in FIG. 2. DSDP modules $54_1$ and $55_1$ are connected by network line $56_2$, DSDP modules $54_2$ and $55_2$ are connected by network line $57_2$, DSDP modules $54_3$ and $55_3$ are connected by network line $58_2$, and DSDP modules $54_4$ and $55_4$ are connected by network line $59_2$. Network lines $56_1$, $56_2$ and $56_3$ form a first channel of the four channel DSDP. Network lines 57, 58 and 59 respectively form the second through fourth channels of the DSDP.

The configuration of the DSDP and the integration of the DSDPCs with the RMUs in the DSDP modules function to distribute good data to processing modules in a channel in the event of failure of that channel's associated DSDPC or incoming network line. For example, if network line $57_2$ or either of the DSDP modules $54_2$ or $55_2$ fails, then the DSDP module $54_2$ will not receive good data from link 572. However, because DSDP modules $54_1$, $54_3$ and $54_4$ will receive good data, this data will be passed to the RMU in the DSDP module $54_2$, where it will be assembled and distributed over the read bus of DSDP module $54_2$. Likewise, given that the DSDPC in the DSDP module $54_2$ is functioning, this data is regenerated and passed to the next processing site, effecting a self-repair of the DSDP.

Figure 7A:
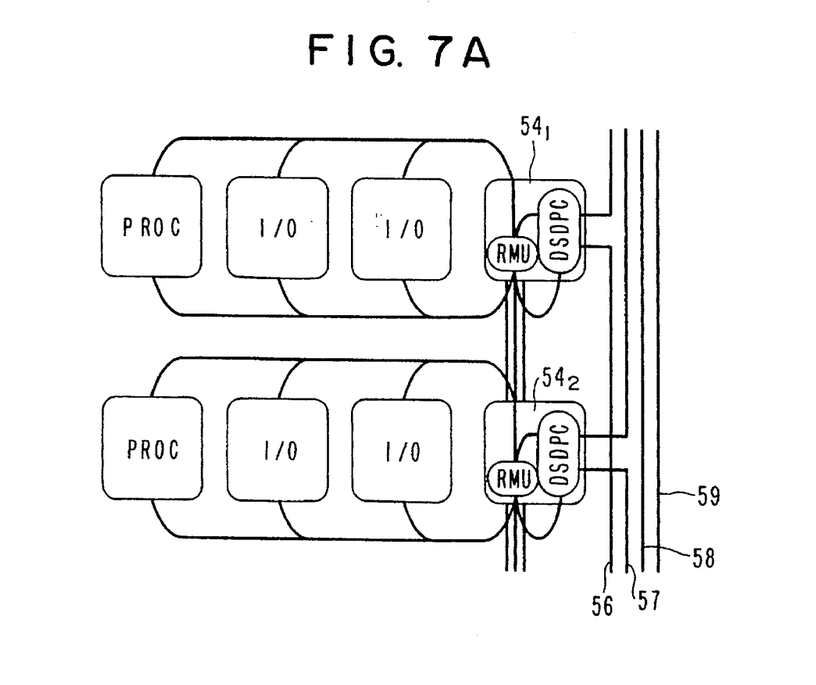
FIG. 7A is a block diagram showing two channels of the quad-redundant DSDP module set shown in FIG. 7.

FIG. 7A is a block diagram showing two channels of the quad-redundant DSDP module set shown in FIG. 7. Like FIG. 5A, FIG. 7A shows I/O modules connected within the channels of the quad-redundant DSDP module set, in addition to processing modules. In FIG. 7A, the four channel DSDP is shown with network lines 56, 57, 58 and 59.

Reliability Analysis

This analysis focuses on a quad-redundant fault-tolerant site. Each channel in the fault-tolerant site holds 20 modules including a DSDP module. Six analyses were done including three different initial conditions and two failure/recovery models. The first initial condition is a full-up system, with no failures. The second initial condition is a system with one module failure. The third initial condition is a system with one RMU failure and, therefore, one failed channel. For each of these three initial conditions analyses were done for two failure/recovery models. One model is conservative with a module failure rate of $10^{-5}$ per hour. The second model is optimistic with a module failure rate of $10^{-6}$ per hour. The RMU failure rate is assumed to be one tenth that of the module failure rate. The recovery time is 1 minute for the conservative model and 15 minutes for the optimistic model. Fault detection coverage is assumed to be 100%. Table I summarizes the results. An analysis of a quad-redundant DSDP having 10 fault-tolerant sites produces identical results.

TABLE I

Reliability Analysis

| Initial Conditions | Module Failure Rate | RMU Failure Rate | Recovery Time (min) | Reliability @10 hr. |
|---|---|---|---|---|
| Full up | $1.0 \times 10^{-5}$ | $1.0 \times 10^{-6}$ | 1 | $<2.0 \times 10^{-9}$ |
|  | $1.0 \times 10^{-6}$ | $1.0 \times 10^{-7}$ | 15 | $<1.0 \times 10^{-9}$ |
| 1 Module Bad | $1.0 \times 10^{-6}$ | $1.0 \times 10^{-6}$ | 1 | $<5.0 \times 10^{-8}$ |
|  | $1.0 \times 10^{-6}$ | $1.0 \times 10^{-7}$ | 15 | $<5.0 \times 10^{-9}$ |
| 1 RMU Bad | $1.0 \times 10^{-5}$ | $1.0 \times 10^{-6}$ | 1 | $<5.0 \times 10^{-7}$ |
|  | $1.0 \times 10^{-6}$ | $1.0 \times 10^{-7}$ | 15 | $<5.0 \times 10^{-9}$ |

Availability Analysis

Availability analyses were done on both a single processing node with five quad-redundant modules (20 total), and a DSDP with 100 modules which are distributed across five fault-tolerant sites on the DSDP. It was assumed that it would be necessary for two modules of the same redundant set to fail before repair was necessary. The probabilities of a repair action for several operating times were derived for the conservative and optimistic systems and are shown in Table II.

TABLE II

Probability of Repair

| Time | Conservative Processing Node | Conservative System | Optimistic Processing Node | Optimistic System |
|---|---|---|---|---|
| 10 hours | $3.0 \times 10^{-7}$ | $1.5 \times 10^{-6}$ | $3.0 \times 10^{-9}$ | $1.5 \times 10^{-8}$ |
| 1 month | $3.0 \times 10^{-4}$ | 0.0014 | $3.0 \times 10^{-6}$ | $1.510^{-5}$ |
| 1 year | 0.05 | 0.20 | $5.0 \times 10^{-4}$ | 0.025 |
| 10 years | 0.98 | 0.99 | 0.10 | 0.30 |

Numerous modifications and adaptations of the present invention will be apparent to those so skilled in the art. For example, although the fault-tolerant fiber optic backplane discussed above serially interconnects local modules to external backplanes and their redundant modules, it may be desirable to instead incorporate a parallel interconnection. Thus, it is intended by the following claims to cover all modifications and adaptations which follow within the true spirit and scope of the present invention.

What is claimed is:

1. A system for implementing fault-tolerant processing using a fiber optic network, comprising:
   a plurality of backplanes including a local backplane and at least one external backplane;
   a plurality of processing modules including at least one local processing module and at least one redundant processing module, each said processing module having a bus control, wherein each said local processing module is optically connected to the local backplane and each said redundant processing module is optically connected to one said external backplane, each said external backplane having an optical connection to at least one said redundant processing module, wherein each backplane comprises:
   (a) redundancy management means for controlling access to the backplane, for comparing data from each said local processing module with data from each said redundant processing module and for producing corrected data based on the comparison, the redundancy management means of each said local backplane being optically interconnected to each said redundancy management means in each said external backplane;
   (b) a local write bus optically connecting each said local processing module to said redundancy management means so that said data from each said local processing module are optically transmittable to said redundancy management means; and
   (c) a local read bus optically connecting said redundancy management means to each said local processing module so that said corrected data are optically transmittable to each said local processing module;
   wherein each said bus control optically connects said local processing module to the local read bus and the local write bus; and
   said redundancy management means includes synchronizing means for synchronizing transmission of said data from each said local processing module through said local write bus and to each said local processing module through said local read bus.

2. A system as recited in claim 1, wherein said redundancy management means further includes:
   means for masking failure of each said local processing module and each said redundant processing module.

3. A system as recited in claim 1, wherein said redundancy management means further includes:
   means for deskewing said data from each said local processing module and each said redundant processing module.

4. A system as recited in claim 3, wherein the redundancy management means further comprises a clock synchronization unit operatively connected to the deskewing means to compute a suitable clock correction which synchronizes the redundancy management means.

5. A system as recited in claim 1, wherein said synchronizing means includes:
   time base generating means for generating a time base, for controlling transmission of said corrected data to each said local processing module through said local read bus based on said time base, and for controlling transmission of said data from each said local processing module to the redundancy management means through said local write bus.

6. A system as recited in claim 4, wherein said synchronizing means further includes:

means for generating a synchronization command and for transmitting said synchronization command to each said local processing module through said local read bus.

7. A system as recited in claim 6, wherein each of the bus controls includes:

means for regenerating said time base based on the timing of said corrected data; and means for monitoring said local read bus and for setting a first register counter to a global time when said synchronization command is detected.

8. A system as recited in claim 7, wherein each said local processing module further includes:

scheduler means, included in said b,us control and operatively connected to receive said global time from said first register counter, for identifying desired input data within said corrected data based on said global time;

processing means, for processing said desired input data to produce processed data;

storage means, operatively connected to said scheduler means and said processing means for storing desired input data and processed data; and transmitter means, included in said bus control, for transmitting and time division multiplexing said processed data through said local write bus based on the regenerated time base.

9. A system as recited in claim 8, wherein said redundancy management means includes:

a second register counter setting said global time;

a scheduler processor, operatively connected to receive said global time from said second register counter, having a look-up table of data identification and data local module source versus global time, said scheduler processor generating a data identification and data local module source signal based on said global time; and a switch, operatively connected to said local write bus and said scheduler processor, selecting said data from each said local processing module based on said data identification and data local module source signal.

10. A system as recited in claim 9, wherein the redundancy management means further comprises:

a distributed system data path controller connected to the scheduler processor and having an input network line for inputting input network data and an output network line for outputting output network data;

means for providing said corrected data to the schedule processor, wherein the scheduler processor selects output network data from the corrected data, wherein said output network data is output to the distributed system data path controller for transmission over the output network line; and means for providing said input network data from the distributed system data path controller to the switch so that said input network data is compared with input network data from redundant distributed system data path controllers, said redundant distributed system data path controllers being identical to said distributed system data path controller and being connected to redundancy management means in each said external backplane.

11. A system as recited in claim 10 wherein:

at least one of said input network line and said output network line of said distributed system data path controller is connected to a second distributed system data path controller to form a first channel of a distributed system data path, said redundant distributed system data path controllers each having an input network line and an output network line, and each of said redundant distributed system data path controllers being respectively connected to additional distributed system data path controllers to form redundant channels of said distributed system data path.

12. A system as recited in claim 1, wherein each said local processing module includes:

means for multiplexing said data from each said local processing module through said local write bus.

13. A system as recited in claim 1, wherein each backplane further comprises at least two replicated redundancy management means optically connected to the local write bus so that each replicated redundancy management means receives the data from each said local processing module.

14. A system as recited in claim 13, further comprising a plurality of replicated local read buses, wherein each local read bus interconnects a replicated redundancy management means to each said local processing module so that said corrected data from the replicated redundancy management means is transmittable through the replicated local read buses to each said local processing module.

15. A system as recited in claim 14, wherein each said local processing module includes an optical combiner that optically combines said corrected data from said redundancy management means and corrected data from said replicated redundancy management means.

* * * * *